XR 2,671,849
EFERENCE SEARCH ROOM

March 9, 1954 E. H. B. BARTELINK 2,671,849

AUTOMATIC VOLUME CONTROL FOR ALTERNATING CURRENT

Filed Nov. 22, 1950

INVENTOR
EVERHARD H. B. BARTELINK
BY Ward, Crosby & Neal
ATTORNEYS

Patented Mar. 9, 1954 2,671,849

UNITED STATES PATENT OFFICE 2,671,849

AUTOMATIC VOLUME CONTROL FOR ALTERNATING CURRENT

Everhard H. B. Bartelink, Bronxville, N. Y., assignor, by mesne assignments, to Automatic Electric Laboratories, Inc., Chicago, Ill., a corporation of Delaware Application November 22, 1950, Serial No. 197,102

11 Claims. (Cl. 250—13)

This invention pertains to automatic volume controls for regulating signal intensity levels in communication systems, and more especially for automatically controlling speech input levels to radio transmitters.

An object of the invention is to provide a relatively simple, cheap and effective device of this character, which is particularly adapted for automatically regulating the radio transmitter speech input level of two-way radio communication links in telephone connections or circuits.

In providing telephone service for mobile radio subscribers' stations, various types of connections are required, or at least desired, connections, for example, between a mobile station and a land-based subscriber's station, or between two or more mobile stations, or between two or more mobile stations and a land-based station. All such calls are routed through a land-based transmitting and receiving station, and for handling the various types of calls above noted, it is necessary to so arrange the land-based transmitting and receiving station that signals received by the land-based receiver from a mobile station will be retransmitted from the land-based transmitter, and will also be transmitted over a wire circuit to a central office for further transmission to a land-based subscriber's station, if desired. In consequence, the speech input level to the land-based radio transmitter is subject to wide variation from call to call and from time to time during the same call. Thus, during the course of a conversation, the source of signals applied to the land-based radio transmitter may be repeatedly switched from a weak signal, received from a land-based subscriber's station via a long wire connection, to a strong signal received from a nearby mobile unit by the land-based radio receiver. Telephone connections of the character aforesaid are becoming increasingly prevalent with the growth of telephone service to subscriber's stations mounted on mobile units, such as automobiles, trains, planes, ship-to-shore service for boats, etc.

In connection with the above, devices for applying automatic volume control to the radio transmitter input are known, but in general are relatively expensive and complicated.

I propose, in accordance with the present invention, to provide a relatively simple and inexpensive device of this character employing a remote-cutoff tube as the automatic gain regulating element, together with an associated rectifier tube, restoring circuit, which is responsive to a carrier current actuated relay of the land-based receiver, for instantly restoring the transmitter input gain to a preselected or normal level each time a switch is made in the direction of speech transmission as aforesaid.

In this connection, it is to be noted that a simple, self-rectifying grid in a remote-cutoff tube does not suffice to provide effective automatic volume control, by reason of its slowness in restoring after being biased in accordance with any given speech level impressed thereon. Hence, if a switch is made from a high speech level signal to an immediately succeeding low speech level signal, the negative grid bias built up on the grid leak condenser as a result of the first signal will not have opportunity to leak off and restore the gain level to normal in readiness for the second signal. Hence, the necessity for the restoring circuit constituting an essential feature of my invention.

In the accompanying drawings:

Fig. 1 illustrates, more or less diagrammatically, a telephone connection between subscribers' stations, one of which is connected over a wire circuit to a land-based radio transmitting and receiving station from whence the connection extends by radio to one or more mobile radio stations. The input to the radio transmitter embodies one modification of an automatic volume control circuit in accordance with the present invention.

Figures 1, 2, 3:
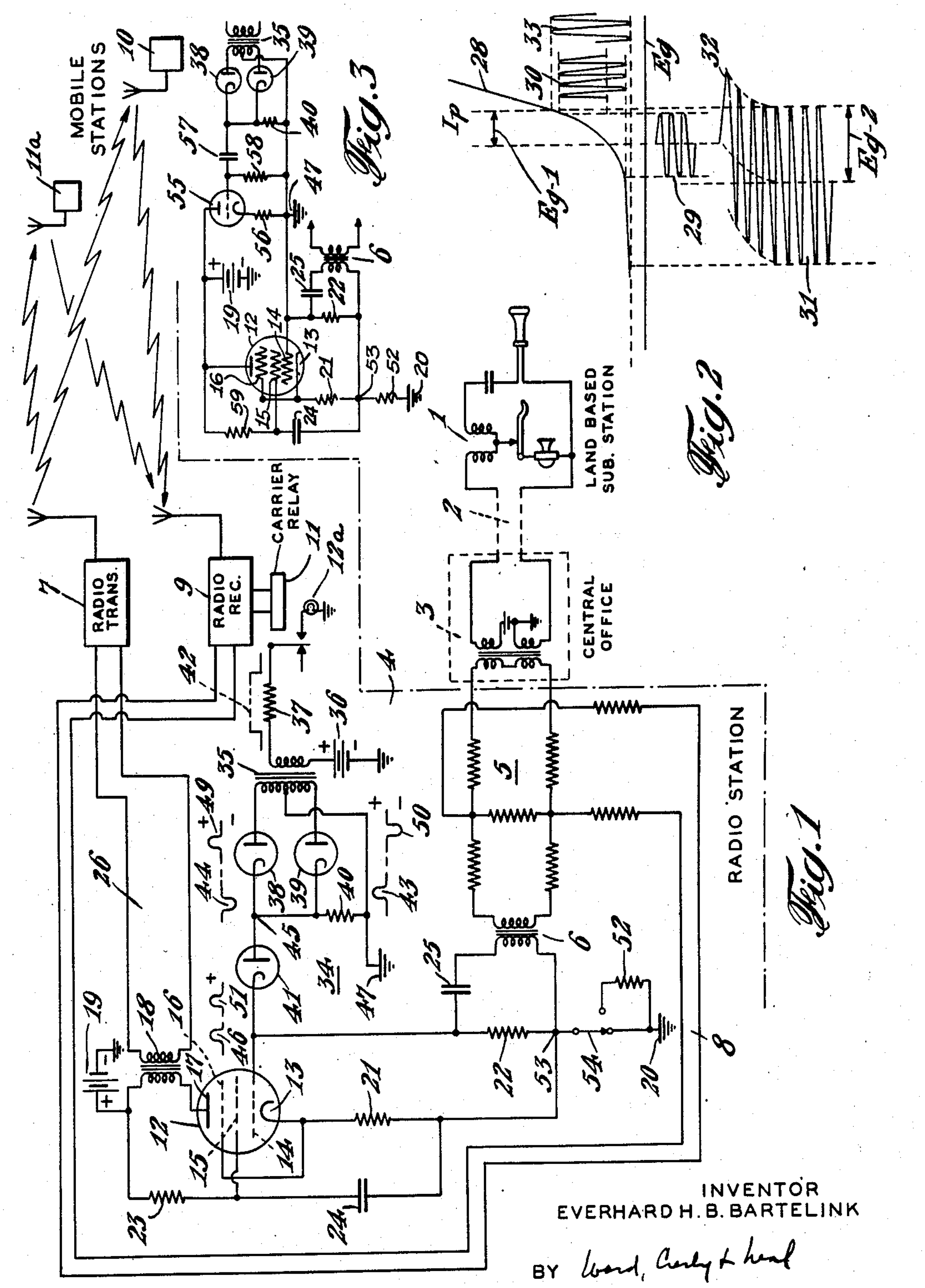
Fig. 2 is a graphical representation of the grid voltage-plate current characteristic of the remote-cutoff tube with accompanying graphs illustrative of its operation to provide automatic volume regulation.
Fig. 3 shows a further modification of an automatic volume control circuit according to the present invention.

Referring to Fig. 1, there is shown at 1 a land-based telephone subscriber's station connected over a wire circuit 2, and through a central office 3, to a land-based radio station 4. At the radio station, the wire circuit 2 is connected through a mixer circuit 5, comprising series and shunt resistances, to an input transformer 6 of a land-based radio transmitter 7; and is also connected through the mixer circuit 5, and over conductors 8 to the output of a land-based radio receiver 9. The radio station is in turn linked by radio to one or more mobile radio stations, such as 10, 11.

The radio receiver 9 includes the usual carrier actuated relay 11 which responds to the carrier current transmitted from a mobile station, such as 9, 10, for actuating a calling signal at the land-based radio station, such as a call lamp 12a, when the carrier of the remote station is switched on.

Interposed between the input transformer 6 and the radio transmitter 7 is the automatic volume control circuit of my invention. This circuit contains a remote-cutoff tube 12, having a heated cathode 13 (which may be indirectly heated by means not shown for simplicity of illustration), a control grid 14, screen grid 15, suppressor grid 16 and plate or anode 17. The anode 17 is connected through the primary of a transformer 18 to the positive terminal of a battery 19 having its negative terminal grounded, the cathode 13 being also grounded at 20 through plate current biasing resistor 21, for energizing the anode circuit of the tube and for applying a normal negative bias to the control grid. The control grid 14 is also connected to ground at 20 through a grid leak resistance 22 for applying a normal and also a supplemental automatic volume control bias to the control grid, as explained below. The suppressor grid 16 is connected to the cathode in conventional fashion, while the screen grid 15 receives a positive potential from battery 19 through a limiting resistance 23, the screen grid being also connected to ground through a by-pass condenser 24.

The secondary winding terminals of input transformer 6, are connected respectively to ground at 20 and through a blocking condenser 25 to the upper terminal of resistance 22, the latter having a high resistance value of a megohm or so. Resistance 22 and condenser 25 thus constitute a grid-leak input to the remote-cutoff tube 12 for impressing thereon a grid-biasing voltage which is proportional to the speech level incoming from station 1 over wire circuit 2, or from stations 10 or 11a through the radio receiver 9 and over circuit 8. The output from tube 12 is coupled through transformer 18 to the input of the radio transmitter 7.

With the arrangement shown, the remote control tube circuit thus responds instantly to speech levels incoming from any of stations 1, 10, 11a, to apply to control grid 14 a biasing voltage proportional to the level of the incoming speech, inasmuch as condenser 25 charges up negatively through the cathode-to-control grid space path of tube 12, which shunts the grid-leak resistance 22. On being so charged, however, the condenser charge is forced to leak off slowly through the high leak resistance 22, since the aforesaid space path of the tube is non-conducting in the direction of the condenser discharge.

Accordingly if a high level speech input from station 10, for example, is immediately succeeded by a low level speech input, for example from station 1, the remote-cutoff tube would be temporarily paralyzed, and hence incapable of applying the proper speech level to the radio transmitter. This action is illustrated by Fig. 2 which shows at 28, the grid voltage $E_g$, plate current $I_p$ characteristic of the remote-cutoff tube 12. $E_g$-1 is the normal bias applied to the control grid 14, by the voltage drop across resistance 21 due to the flow of plate current therein. If a signal of amplitude not exceeding this normal bias $E_g$-1 is applied to the input of tube 12, such as that shown at 29, Fig. 2, no additional bias will build up on the control grid 14 by action of the grid leak 22, 25, so that the output signal from tube 12, impressed on the input to radio transmitter 7, will be as indicated at 30. If, on the other hand, a signal of amplitude exceeding $E_g$-1 is applied to the tube input, such as is indicated at 31, condenser 25 will charge up negatively each time cathode 13 is swung positive with respect to grid 14 by the impressed signal, as indicated at 32, Fig. 2. Accordingly, an ultimate negative bias is built up in the grid of sufficient value to prevent positive grid excursions. This is indicated at $E_g$-2, while the output signal from tube 12 impressed on the radio transmitter, as indicated at 33, is substantially equal in amplitude to that at 30, derived from the low level signal 29.

In general, the signal incoming from a mobile station, such as 10, will be of sufficient amplitude to build up a negative bias on the grid leak condenser 25, by virtue of the amplification introduced by radio receiver 9. This charge will require considerable time to leak off through the high resistance 22. Accordingly, if a second call is placed immediately after the first call is terminated, the AVC tube 12 will be temporarily operating at low gain because of the negative charge accumulated on condenser 25 as a result of the first call, so that the circuit will not be in condition properly to adjust the bias on tube 12, in conformity with the volume level received on the second call. The same difficulty is encountered during a call between a land-based and a mobile subscriber's station, each time the mobile station switches over from transmitting to receiving.

In order to overcome this defect, I provide, in accordance with my invention, a restoring circuit, shown generally at 34, for automatically discharging condenser 25 at the conclusion as well as at the beginning of each switchover or call aforesaid, and in response to the operation or release of the carrier current actuated relay 11. To this end, circuit 34 comprises a two-winding transformer 35, the primary winding of which is connected from the negatively grounded battery 36 through a resistance 37 to the armature of relay 11. The secondary winding of transformer 35 is connected at its opposite terminals to the anodes respectively of a pair of rectifier tubes 38, 39, the cathodes of which are connected through a load resistance 40 to the midpoint of the transformer secondary winding. From the cathodes of diodes 38, 39, another connection extends to the anode of a third rectifier tube 41, the cathode of which is in turn connected to the control grid 14 of the AVC pentode tube.

The operation of the restoring circuit 34 is as follows: Since the primary circuit of transformer 35 is normally deenergized because the contacts of relay 11 are open, as shown, no current flows in this circuit while the radio station is idle. However, if a call is placed between stations, such as 1 and 10, relay 11 will operate when station 10 switches on its radio transmitter, by the carrier current received therefrom in radio receiver 9, and will remain operated until the transmitter at station 10 is cut off, whereupon relay 11 will release. Thus, the current flowing in the primary circuit of transformer 35 will vary with time, as indicated at 42, Fig. 1, being zero before relay 11 operates, jumping abruptly to a constant value when the relay operates, and dropping abruptly again to zero when this relay releases.

In consequence, when relay 11 operates, a positive voltage kick will be impressed on the anode of rectifier 39, as indicated at 43, and an accompanying negative voltage kick will be impressed on the anode of rectifier 38, as indicated at 44. This is due to the action of the transformer primary on the secondary winding and the circuit connections above described. However, only the positive voltage kick is transmitted to point 45 in the circuit, since the negative kick is blocked off by the action of rectifier 38 which is non-conducting when its anode is negative relative to its cathode. The positive voltage kick thus transmitted to point 45 swings the anode of rectifier 41 momentarily positive relative to its cathode, as indicated at 46, owing to the direct connection of this anode to point 45. In consequence, any negative charge which has accumulated, in the manner above described, on the grid condenser 25 of tube 12, will now be discharged through rectifier tube 41 and resistor 40 to ground at 47. Thus, the AVC tube 12 is automatically adjusted to its normal bias $E_g$-1, by operation of relay 11, thereby placing the AVC tube in condition for adjusting the speech level input to radio transmitter 7 in conformity with the next level of speech received.

The restoring circuit operates in essentially the same way when relay 11 releases upon switching off of the carrier from the mobile station. Thus, when relay 11 releases, the resulting cutoff of current flow in the primary circuit of transformer 35 momentarily swings the anode of rectifier tube 38 positive, as shown at 49, while concurrently swinging the anode of rectifier tube 39 negative, as shown at 50, relative to the cathodes of these tubes respectively. The negative pulse 50 is blocked off by the action of rectifier tube 39, and only the positive pulse 49 transmitted, whereby point 45 swings positive again to swing the anode of rectifier tube 41 positive relative to its cathode, as indicated at 51, thus discharging to ground at 47 any negative charge accumulated on condenser 25.

With the circuit of Fig. 1 arranged as above described, negative biasing voltage built up on condenser 25, tends to leak off to ground at 47 through rectifier 41 and resistor 40, since the rectifier is conducting in this direction. This limits the permissible negative swing of the pentode control grid 14. To overcome this limitation, the anode of rectifier 41 may be negatively biased with respect to its cathode, as for example by interposing a positively grounded voltage source in the ground lead 47. This same result may be accomplished by connecting a plate current biasing resistor 52 between ground 20 and point 53 of the circuit, as for example by operating switch 54 to the right. This bias is preferably adjusted approximately to twice the maximum signal voltage impressed on the pentode control grid 14. Rectifier 41 is thus rendered normally non-conducting, and becomes conducting only during incidence thereon of the positive pulses, such as 46, 51, these being of sufficient magnitude to overcome the normal negative bias of the rectifier anode.

Referring to Fig. 3, the circuit arrangement and operation of this modification of the automatic volume control circuit of the present invention is essentially the same as that of Fig. 1, except for substitution for the diode 41, of a grid controlled electronic tube 55, like elements in the two circuits being otherwise similarly designated. In Fig. 3, the space path of tube 55 is energized from battery 19, the control grid being normally biased substantially to cutoff, by means of the plate current biasing resistor 56 interposed between the cathode and the ground lead 47. The control grid of tube 55 is connected to the cathodes of rectifiers 38, 39 through a blocking condenser 57, any negative charge accumulating on which, leaks off to ground at 47 through the leak resistor 58. The ground lead 47 is also connected to the control grid 14 of the pentode 12, this control grid being normally negatively biased with respect to its cathode by the flow of plate current through the biasing resistors 52, 21. Likewise the pentode control grid 14 is normally biased negatively with respect to point 53 of the circuit by the voltage drop across resistor 52, by an amount equal approximately to twice the maximum negative swing of control grid 14 due to signals impressed on the input transformer 6. Accordingly, biasing voltages accumulating on condenser 25 resulting from received signals, are normally prevented from leaking off, owing to this biasing voltage coupled with the fact that tube 55 is normally non-conductive. When, however, the carrier relay 11 is actuated or released, the full wave rectifier circuit 38, 39, 40, swings the grid of tube 55 momentarily positive with respect to its cathode, whereby the space path of tube 55 becomes momentarily conducting, thus permitting condenser 25 to discharge through tube 55 and battery 19.

For adjusting the voltage drop across resistance 52 independently of that across resistance 21, resistor 59 may be bridged between the pentode anode and point 53 of the circuit. A similar arrangement may be employed in the circuit of Fig. 1, if desired.

I claim:

1. In a wave signaling system, an automatic volume control circuit comprising: an electronic tube having an anode, cathode and control grid; means normally biasing said control grid negative with respect to said cathode, for adjusting said tube to the lower curved portion of its grid voltage-plate current characteristic; a signal input circuit connected between said control grid and cathode, said circuit including a blocking condenser connected in series therein in that portion of said circuit which is connected to said grid; a leak resistor connected across said input circuit; a unilateral impedance device having a cathode and an anode; said unilateral impedance device connected across said input circuit; the cathode of said unilateral impedance device connected to said control grid; and means including a full wave rectifier for rendering said unilateral impedance momentarily conducting, thereby to discharge a negative charge accumulated on said blocking condenser.

2. In a wave signaling system, an automatic volume control circuit comprising: an electronic tube having an anode, cathode and control grid; means normally biasing said control grid negative with respect to said cathode, for adjusting said tube to the lower curved portion of its grid voltage-plate current characteristic; a signal input circuit connected between said control grid and cathode, said circuit including a blocking condenser connected in series therein in that portion of said input circuit which is connected to said grid; a leak resistor connected across said input circuit; a unilateral impedance device having a cathode and an anode; said unilateral impedance device connected across said input circuit; the cathode of said unilateral impedance device connected to said control grid; and means including a full wave rectifier and a relay for rendering said unilateral impedance momentarily conducting, thereby to discharge a negative charge accumulated on said blocking condenser.

3. In a wave signaling system, an automatic volume control circuit comprising: a remote-cutoff electronic tube having an anode, cathode and control grid; means normally biasing said control grid negatively with respect to said cathode; a signal input circuit connected between said cathode and said control grid; a blocking condenser connected in series in that portion of said input circuit which is connected to said control grid; a leak resistor connected between said control grid and cathode; a first rectifier having a cathode and anode connected across said input circuit; said rectifier cathode being connected to said control grid; means for normally applying a negative biasing potential to said rectifier anode; and means including a full wave rectifier for rendering said first rectifier momentarily conducting, thereby to remove a negative charge accumulated on said blocking condenser.

4. In a wave signaling system, an automatic volume control circuit comprising: a remote-cutoff electronic tube having an anode, cathode and control grid; means normally biasing said control grid negatively with respect to said cathode; a signal input circuit connected between said cathode and said control grid; a blocking condenser connected in series in said input circuit in that portion of said input circuit which is connected to said grid; a leak resistor connected between said control grid and cathode; a first rectifier having a rectifier cathode and rectifier anode connected across said input circuit; said rectifier cathode being connected to said control grid; means for normally applying a negative biasing potential to said rectifier anode; and means including a full wave rectifier and a relay for rendering said first rectifier momentarily conducting, thereby to remove a negative charge accumulated on said blocking condenser.

5. In a wave signaling system, an automatic volume control circuit comprising: a remote-cutoff electronic tube having an anode, cathode and control grid; means normally biasing said control grid negatively with respect to said cathode; an input circuit connected between said cathode and said control grid; a blocking condenser connected in series in said input circuit in that portion of said input circuit which is connected to said grid; a leak resistance connected between said control grid and cathode; means normally biasing said control grid negatively with respect to the cathode side of said input circuit; a second electronic tube having an anode, cathode and control grid; a connection from the control grid of the remote-cutoff tube to the cathode of said second tube; means for energizing the space path of said second tube, including means for normally biasing said tube substantially to cutoff; and means including a full wave rectifier for rendering the space path of said second tube momentarily conducting, thereby to discharge a negative charge accumulated on said blocking condenser.

6. In a wave signaling system, an automatic volume control circuit comprising: a remote-cutoff electronic tube having an anode, cathode and control grid; means normally biasing said control grid negatively with respect to said cathode; an input circuit connected between said cathode and said control grid; a blocking condenser connected in series in said input circuit in the control grid side of said input circuit; a leak resistance connected between said control grid and cathode; means normally biasing said control grid negatively with respect to the cathode side of said input circuit; a second electronic tube having an anode, cathode and control grid; a connection from the control grid of the remote-cutoff tube to the cathode of said second tube; means for energizing the space path of said second tube, including means for normally biasing said tube substantially to cutoff; and means including a full wave rectifier and a relay operated responsive to a carrier wave to cause a pulse to be applied to said full wave rectifier for rendering the space path of said second tube momentarily conducting, thereby to discharge a negative charge accumulated on said blocking condenser.

7. An automatic volume control responsive to alternating current comprising: a remote cutoff electronic tube having anode, cathode and control grid electrodes; a leak resistor connected between said cathode and grid, an input circuit connected between said grid and said cathode; a blocking condenser connected in series in said input circuit in the grid side of said input circuit; and means for discharging a negative grid biasing charge accumulated on said condenser; said means comprising a transformer having primary and secondary windings, a pair of rectifiers having their anodes connected to the opposite terminals of said transformers secondary and their cathodes connected through an impedance to an intermediate point thereon, a third rectifier connected across said input circuit with its cathode to said control grid side of said input circuit and its anode to the cathode side of said input circuit through said impedance, and means for impressing a direct current voltage on said transformer primary.

8. An automatic volume control responsive to alternating current comprising: a remote-cutoff electronic tube having anode, cathode and control grid electrodes; a leak resistor connected between said cathode and grid; an input circuit connected between said grid and said cathode; a blocking condenser connected in series in said input circuit in the grid side of said input circuit; and means for discharging a negative grid biasing charge accumulated on said condenser; said means comprising a transformer having primary and secondary windings, a pair of rectifiers having their anodes connected to the opposite terminals of said transformer secondary and their cathodes connected through an impedance to an intermediate point thereon; a third rectifier connected across said input circuit with its cathode to said control grid and its anode to the cathode side of said input circuit through said impedance, a circuit containing said transformer primary and a direct voltage source, and switching means for opening and closing said circuit.

9. In a communication system: a radio transmitter; a radio receiver including a carrier current actuated relay; an automatic volume control for said transmitter comprising a remote-cutoff electronic tube having anode, cathode and control grid electrodes; an output connection from said anode to said transmitter; an input connection to said grid including a blocking condenser; a leak resistance between said cathode and grid; a rectifier having a cathode connected to said grid and an anode; and means including said relay and a full wave rectifier for impressing a positive potential on said rectifier anode, thereby to discharge a negative grid biasing voltage accumulated on said condenser.

10. In a communication system: a radio transmitter; a radio receiver including a carrier current actuated relay; an automatic volume control for said transmitter comprising a remote-cutoff electronic tube having anode, cathode and control grid electrodes; an output connection from said anode to said transmitter; an input connection to said grid including a blocking condenser; a leak resistance between said cathode and grid; and means for discharging a negative grid biasing voltage accumulated on said condenser, said means including a first rectifier having a cathode connected to said grid and an anode connected to the cathodes of a second and third rectifier, said second and third rectifiers having anodes connected respectively to the opposite terminals of a transformer secondary winding and their cathodes connected through an impedance to an intermediate point thereon; a primary winding for said transformer; and a direct voltage source connectible thereto through contacts of said relay.

11. In a communication system, a radio receiver, an automatic volume control for said radio receiver, said automatic volume control comprising a carrier operated relay, a transformer, a full wave rectifier stage, a half wave rectifier stage and an electronic tube stage, said electronic tube stage comprising a remote cut-off electronic tube having anode, cathode and control grid electrodes, an input circuit for said tube connected from the output of said radio receiver across the control grid and cathode of said tube, and an output circuit for said tube including the anode of said tube, a condenser connected in series in the input circuit of said tube in the control grid side of said input circuit, a grid-leak resistor connected between the control grid and cathode of said tube, said half wave rectifier stage for discharging a negative grid biasing charge accumulated on said condenser comprising a rectifier and a resistor connected in series across said input circuit, said rectifier having a cathode and anode, said rectifier cathode connected to the grid side of said input circuit, said full wave rectifier for producing positive pulses to said half wave rectifier to cause said half wave rectifier to discharge a charge accumulated on said condenser comprising a pair of rectifiers having anodes connected to the opposite terminals of said transformer secondary and cathodes connected to the anode of said half wave rectifier, the middle point of said transformer secondary connected to the cathode side of said input circuit, said relay connected to said radio receiver so that said relay is operated by a carrier wave received by said receiver and restored when said carrier wave ceases, a circuit for said transformer primary including said primary, a direct current source and contacts of said relay, whereby a changing current passes through said transformer primary when said relay is operated and when said relay is restored.

EVERHARD H. B. BARTELINK.

References Cited in the file of this patent

UNITED STATES PATENTS

| Number | Name | Date |
|---|---|---|
| 1,987,470 | Dijksterhuis | Jan. 8, 1935 |
| 2,232,080 | Seidelbach | Feb. 18, 1941 |
| 2,337,196 | Hollingsworth | Dec. 21, 1943 |
| 2,393,921 | Mason | Jan. 29, 1946 |
| 2,536,051 | Frank et al. | Jan. 2, 1951 |

FOREIGN PATENTS

| Number | Country | Date |
|---|---|---|
| 583,800 | Great Britain | Dec. 31, 1946 |